No. 735,956. PATENTED AUG. 11, 1903.
E. R. DOUGLAS.
ROTARY MOTOR.
APPLICATION FILED OCT. 9, 1900.
NO MODEL. 6 SHEETS—SHEET 1.

Fig. 1

No. 735,956. PATENTED AUG. 11, 1903.
E. R. DOUGLAS.
ROTARY MOTOR.
APPLICATION FILED OCT. 9, 1900.
NO MODEL. 6 SHEETS—SHEET 2.

No. 735,956. PATENTED AUG. 11, 1903.
E. R. DOUGLAS.
ROTARY MOTOR.
APPLICATION FILED OCT. 9, 1900.
NO MODEL. 6 SHEETS—SHEET 5.

Witnesses.
Inventor
Edwin Rust Douglas.
by Chas. F. Earll
atty.

No. 735,956. PATENTED AUG. 11, 1903.
E. R. DOUGLAS.
ROTARY MOTOR.
APPLICATION FILED OCT. 9, 1900.
NO MODEL. 6 SHEETS—SHEET 6.
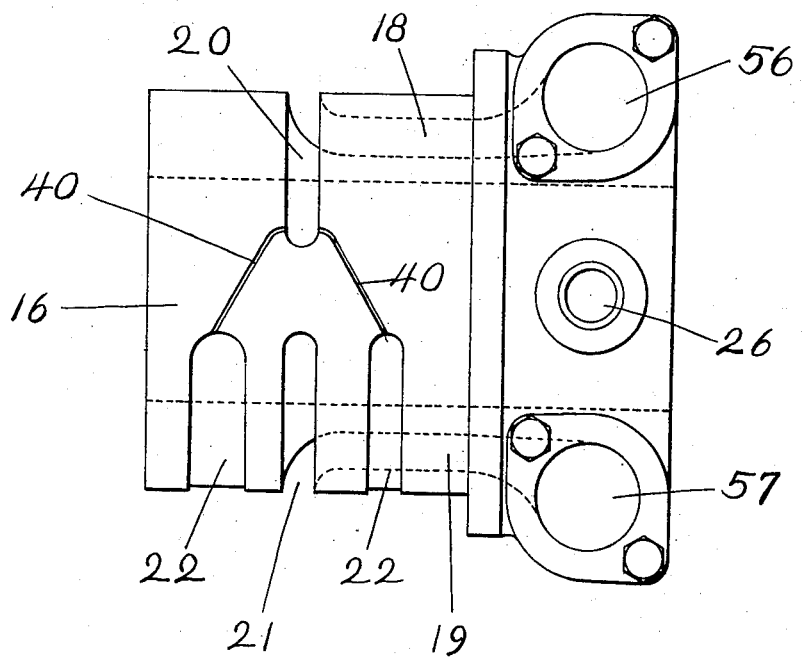

No. 735,956. Patented August 11, 1903.

UNITED STATES PATENT OFFICE.

EDWIN RUST DOUGLAS, OF EAST ORANGE, NEW JERSEY, ASSIGNOR TO CROCKER-WHEELER COMPANY, OF AMPERE, NEW JERSEY, A CORPORATION OF NEW JERSEY.

ROTARY MOTOR.

SPECIFICATION forming part of Letters Patent No. 735,956, dated August 11, 1903.

Application filed October 9, 1900. Serial No. 32,486. (No model.)

*To all whom it may concern:*

Be it known that I, EDWIN RUST DOUGLAS, a citizen of the United States of America, and a resident of East Orange, county of Essex, and State of New Jersey, have invented certain new and useful Improvements in Rotary Motors, of which the following is a specification.

My invention relates to rotary fluid-motors, and has for its object to produce a motor of this class that shall be simple and effective in its construction and operation and one in which speed of rotation relative to the amount of fluid used may be easily varied and the direction of rotation easily reversed. The fluid used may be either liquid or gaseous, and the latter when employed may be used expansively, as steam is used in a steam-engine.

My invention may also be used as a variable-speed gear for the transmission of power, or, again, it may be used as a pump.

My invention consists in providing a rotatable annular chamber with pistons which are adapted to travel around with said annular chamber in a circular path with varying velocities relative to each other and to said annular chamber, but having the same mean velocity, and in connecting said pistons with a rotatable member whose axis of revolution is located eccentrically to the axis of said annular chamber.

My invention consists, further, in providing suitable inlet and outlet ports for the fluid and in providing means for varying the eccentricity of the said rotatable member, whereby the motor is reversed or its capacity increased or diminished, and in other features hereinafter explained.

Figure 2:
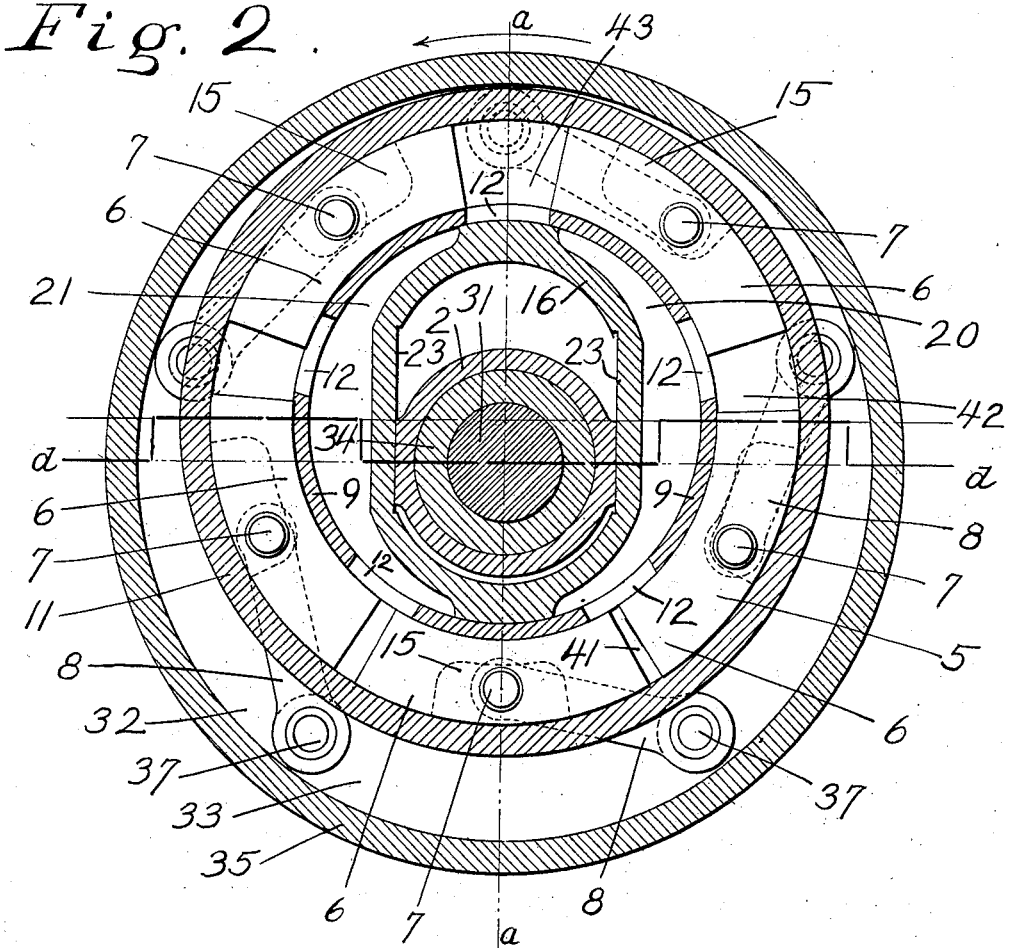
Figure 3:
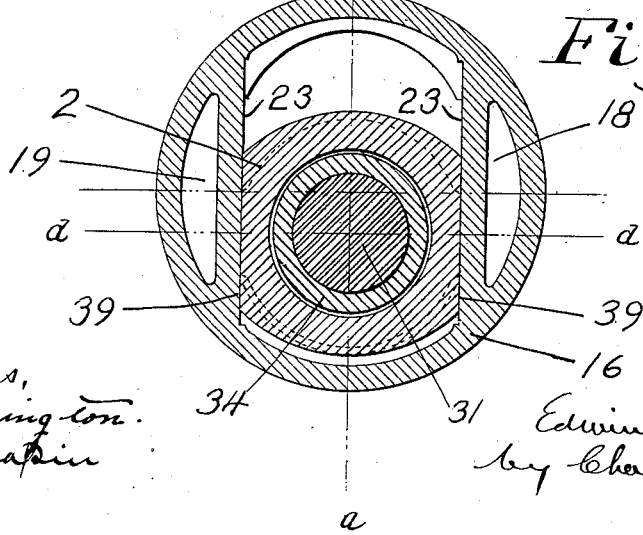
Figure 4:
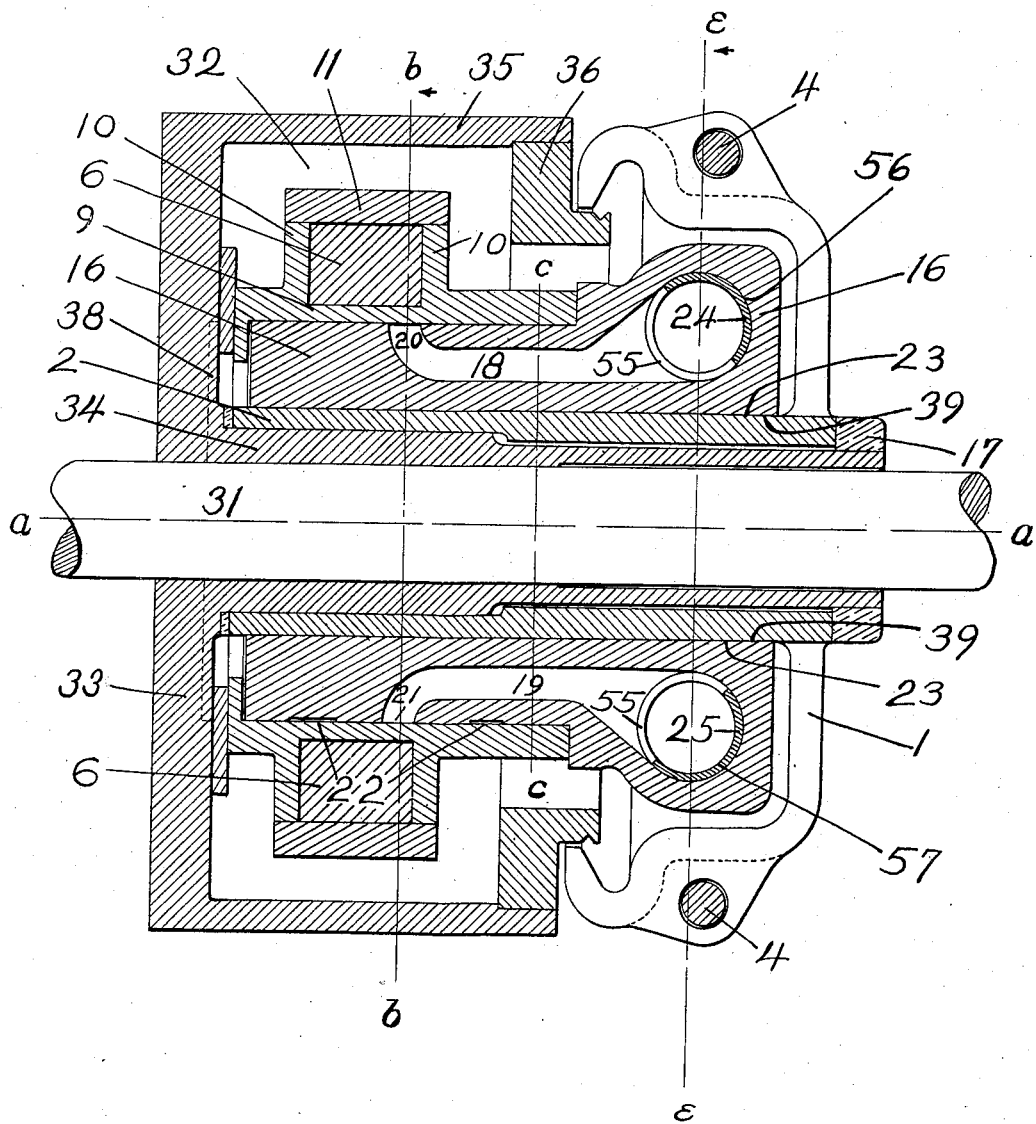
Figure 5:
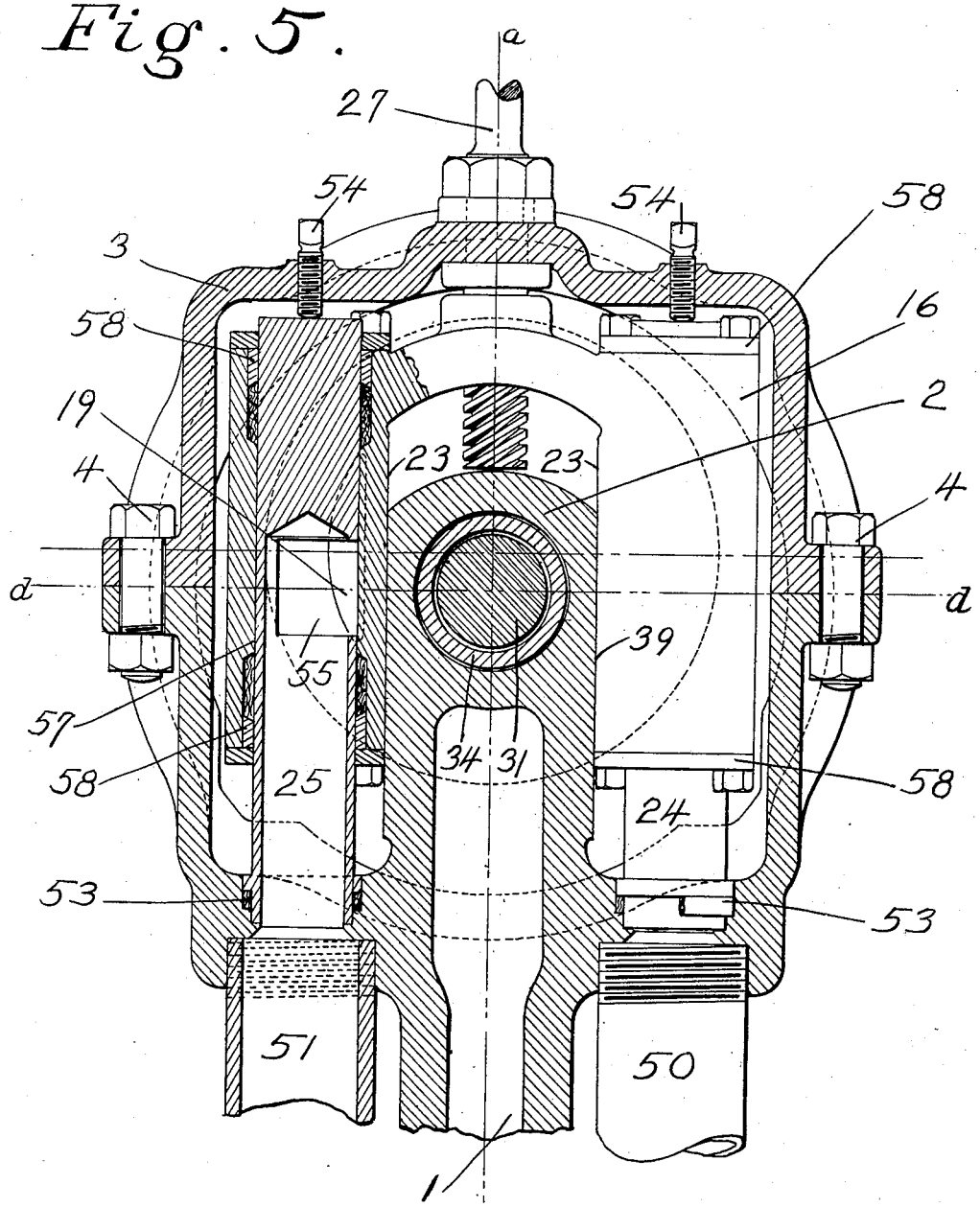
Figure 6:
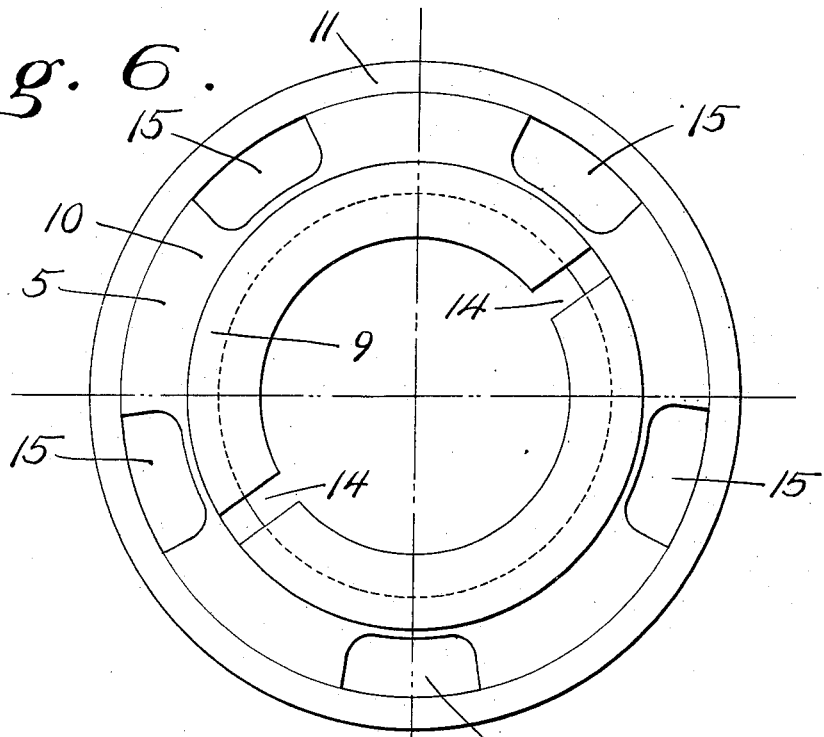
Figures 7, 8:
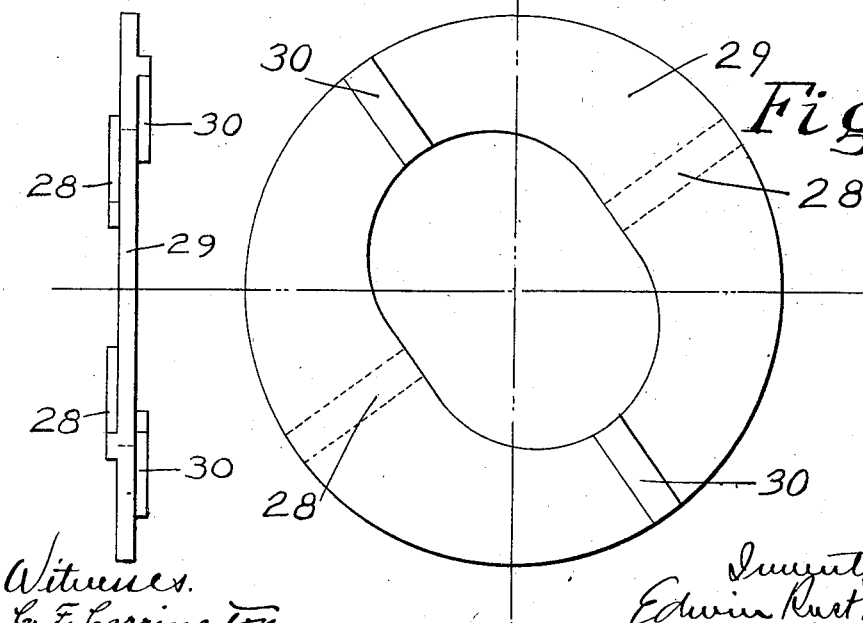

In the drawings accompanying and forming part of this specification, Figure 1 is a vertical section on line $a\ a$, Fig. 5. Fig. 2 is a vertical transverse section on line $b\ b$, Figs. 1 and 4. Fig. 3 is a vertical transverse section of the port-ring on line $c\ c$, Figs. 1 and 4. Fig. 4 is a horizontal section on line $d\ d$, Fig. 1. Fig. 5 is a vertical transverse section on line $e\ e$, Figs. 1 and 4. Fig. 6 is an end view of the piston-chamber. Fig. 7 is a front view of the coupling-ring. Fig. 8 is a side view of the same, and Fig. 9 is a top view of the port-ring.

The various characters of reference are used in the same sense in all of the figures.

Numeral 1 represents the frame, which may be of any suitable construction adapted to support the working parts.

2 represents a bearing rigidly attached to the main frame and preferably cast integrally therewith.

3 represents a cap, which forms part of the main frame, to which it is secured by the bolts 4.

5 represents an annular piston-chamber. 6 represents pistons adapted to operate in said piston-chamber. 7 represents pins pivotally connected with said pistons. 8 represents links pivotally connected with said pistons by means of the pins 7 and with the rotatable member or driving-drum 32 by means of the studs 37.

9 represents the inner cylindrical part of the piston-chamber, which is fitted upon the port-ring 16.

10 represents the side flanges, and 11 the cylindrical cover of the piston-chamber.

12 represents openings or ports in the inner cylindrical part 9 of the piston-chamber.

14 represents a groove in the end of the piston-chamber, adapted to engage the tongue 28 of the coupling-ring.

15 represents openings in the flanges of the piston-chamber, through which the pins 7 pass, which openings are elongated to permit a limited movement of the pistons relative to the piston-chamber.

16 represents the port-ring upon which the piston-chamber revolves.

17 represents a collar secured to the sleeve 34.

18 represents an inlet-passage in the port-ring 16, 19 an outlet-passage in the same, and 20 and 21 are the inlet and outlet ports, respectively, in the port-ring, which in connection with the ports 12 in the piston-chamber control the inlet and exhaust.

22 represents chambers in the exterior surface of the port-ring for the purpose of counterbalancing the pressure of the piston-chamber on the port-ring. They are connected by the small ducts or passages 40 with the port 20.

23 represents flat surfaces on the port-ring which engage the flat surfaces 39 of the bearing 2.

24 and 25 are respectively inlet and outlet tubes which are plugged or made solid at one end and communicate at their open ends with the pipes 50 and 51. The open ends of said tubes are held in position in recesses 53 in the main frame, in which they are pressed by the screws 54 in the cap 3. The tubes 24 and 25 are provided with openings 55, which open into the inlet and outlet passages 18 and 19.

56 and 57 are cylindrical holes in the port-ring, in which are fitted, respectively, the inlet and outlet tubes 24 and 25, this arrangement permitting a vertical movement of the port-ring.

58 represents stuffing-boxes of usual construction to prevent leakage between the inlet and outlet tubes and the port-ring.

26 represents a threaded hole in the port-ring engaging the lead-screw 27.

28 is a tongue on the coupling-ring 29, which engages the groove 14 in the end of the piston-chamber. 30 is a corresponding tongue on the opposite side of the coupling-ring, which engages the rotary driving-drum 32. The coupling-ring 29, with its tongues 28 and 30, disposed on opposite sides of said ring and at right angles to each other, together with the grooves 14 in the end of the piston-chamber and the groove 38 in the driving-drum, constitute a coupling of the form known as the "Oldham" coupling, which causes the driving-drum and the piston-chamber to revolve in the same direction and at the same velocity regardless of the eccentricity between said drum and said piston-chamber in a manner that is well understood. Any other convenient form of coupling might be employed for this purpose.

31 is a shaft secured to the driving-drum 32.

33 is a flange forming the closed end of the driving-drum 32, and 34 is a hub or sleeve secured thereto, said hub or sleeve engaging the shaft 31 on its inner bore and the bearing 2 on its outer circumference and extending through said bearing and having secured at its end the collar 17, which prevents lateral motion of the drum.

35 is a cylindrical shell forming the exterior of the drum, and 36 is a ring secured to the shell 35.

37 represents studs secured to the flange 33 and the ring 36, said studs engaging the links 8.

38 represents a groove in the flange 33, which engages the tongue 30 of the coupling-ring.

39 represents flat surfaces on the bearing 2, which engage the surfaces 23 of the port-ring.

41 represents the space between two adjacent pistons when said pistons are near the position of admission. 43 represents the space when the pistons are near the position of exhaust and 42 when they are in an intermediate position.

In the operation of my invention when used as a motor the inlet-pipe 50 is connected to a supply of fluid under pressure, the said fluid passing through the inlet-tube 24, passage 18, and the port 20 to the spaces 41 and 42 between the pistons. The pressure in any space, as 42, exerted on the forward piston tends to cause the driving-drum to rotate to the left, as seen in Fig. 2, and the pressure exerted on the rear piston tends to cause it to rotate to the right; but owing to the position of the pistons and the links connecting them with the driving-drum the pressure on said forward piston acts through a greater lever-arm and overbalances that on the rear piston, and both are thus caused to rotate to the left. The spaces 41 and 42 gradually increase until they have successively reached the position 43, where they are at maximum. The port 20 may be arranged to cut off the supply from the space between the pistons at any convenient point between the position 41 and 43. The port 21 is arranged to be uncovered as the piston passes beyond the position indicated by the space 43, thereby permitting the fluid therein contained to be exhausted through the passage 19, outlet-tube 25, and exhaust-pipe 51. It is thus seen that as the driving-drum revolves the pistons approach and recede from each other, but that the mean velocity of the pistons is the same as that of the driving-drum and that the piston-chamber by means of its connection with the driving-drum rotates at the same speed as the driving-drum. It is also seen that the amount of slip of the pistons within the piston-chamber is equal to the amount that they separate from and approach toward each other—that is, it is proportional in amount merely to the effective displacement of the piston and not to its actual travel. The amount of work done by each piston-space, as 42, is of course proportional to the mean effective pressure of the fluid therein contained multiplied by the volumetric change of the piston-space from the time the fluid is admitted to the time it is exhausted therefrom. To reverse the motor or to change its capacity when used as a pump, the port-ring is shifted by the screw 27, so as to change the eccentricity between it and the driving-drum 32. It is evident that when the axis of the piston-chamber is made to coincide with the axis of the driving-drum the space between any two pistons will remain the same while revolving and that no fluid will pass through and that the greater the eccentricity the greater will be the piston displacement and consequent capacity of the motor or pump. It is also evident that when the axis of the piston-chamber is moved to the opposite side of the driving-drum the direction of rotation of the motor will be reversed.

The coupling between the piston-chamber and the driving-drum may be dispensed with, in which case the piston-chamber would be caused to revolve by the friction of the pistons in said chamber or, if the friction were insufficient, by the contact of one of the pins 7 with the end of the openings 15 in the flanges 10 of the piston-chamber. In this latter case, however, the piston-chamber would be driven successively by each succeeding pin, and the motion would be somewhat irregular. Again, by replacing one of the elongated openings 15 with a cylindrical hole which shall fit one of the pins 7 the revolution of the piston-chamber may be controlled by the particular piston so connected. In this case, however, the velocity of the piston-chamber would not be the same at all points of its revolution, but would be accelerated and retarded once during each revolution. I therefore prefer to use the coupling as described.

In order to counterbalance the pressure of the piston-chamber upon the port-ring, I provide the recesses 22, which are connected with the port 20 by the small ducts or passages 40. These chambers 22 are disposed on the side of the port-ring opposite to the inlet-port 20, to which they are connected by the passages 40. There is therefore a fluid-pressure in the recesses 22 at all times equal to that in the port 20 and exerting a counterbalancing pressure upon said port-ring.

Having thus described my invention, what I claim is—

1. In a rotary motor the combination with a rotary annular piston-chamber and pistons adapted to operate therein of a rotatable driving member eccentric to said rotary annular piston-chamber, each successive piston being connected independently with said rotatable driving member.

2. In a rotary motor the combination with an annular piston-chamber rotatably mounted, and pistons adapted to operate therein, of ports adapted to be opened and closed by the rotation of said piston-chamber to admit fluid under pressure to, and to exhaust it from the spaces between said pistons, and rotatable driving member located eccentrically to said piston-chamber, and independent connections connecting each piston with said driving member.

3. In a rotary motor, the combination with a frame of a bearing secured to said frame, a rotary driving member journaled in said bearing, a port-ring slidably mounted on said frame, a rotatable annular piston-chamber revolubly mounted on said port-ring, pistons adapted to operate in said piston-chamber, and means for connecting said pistons with said driving member and means for adjusting the position of said port-ring.

4. In a rotary motor, the combination with a frame of a bearing secured to said frame, a rotary driving member journaled in said bearing, a port-ring mounted on said frame, a rotatable annular piston-chamber revolubly mounted on said port-ring, pistons adapted to operate in said piston-chamber and means for connecting each successive piston with said driving member.

5. In a rotary motor, the combination with an annular piston-chamber and pistons adapted to be received therein, of a rotatable driving member eccentric to said annular piston-chamber and means for connecting each piston independently with said eccentric driving member in different radial positions.

6. In a rotary motor, the combination with an annular piston-chamber revolubly mounted on a stationary port-ring, said port-ring being provided with inlet and outlet passages and ports, of pistons adapted to operate in said piston-chamber, an eccentric driving member and means for connecting each successive piston with said driving member.

7. In a rotary motor, the combination with an annular piston-chamber revolubly mounted on a port-ring, said port-ring being provided with inlet and outlet passages and ports, and said chamber being provided with suitable ports adapted to operate with the ports in said port-ring, of pistons adapted to operate in said piston-chamber, an eccentric driving member and means for connecting said pistons with said driving member.

8. In a rotary motor, the combination with an annular chamber and pistons adapted to operate therein, of a driving member arranged eccentrically to said chamber, means for connecting said pistons with said driving member, and means for varying the eccentricity between said driving member and said piston-chamber.

9. In a rotary motor, the combination with an annular piston-chamber revolubly mounted on a port-ring and pistons adapted to operate in said annular chamber, of a rotatable member, means for connecting said pistons with said rotatable member and a bearing intermediate between the rotatable member and the port-ring.

10. In a rotary motor, the combination with an annular chamber revolubly mounted on a port-ring and pistons adapted to operate in said annular chamber, of a rotatable member 32, means for connecting said pistons with said rotatable member, the frame 1, and the bearing 2 supported by the frame and in turn supporting said rotatable member and said port-ring.

11. In a rotary motor, the combination with an annular chamber revolubly mounted on a port-ring and pistons adapted to operate in said annular chamber, of pins passing through said pistons and through the end walls of said annular chamber and carrying links at their ends, an eccentric driving member, the said driving member being provided with studs which are adapted to carry the ends of the said links and thereby control the motion of said pistons in said annular chamber, means for causing said piston-chamber and said driving member to rotate together, and means for varying the eccentricity of said driving member relative to said piston-chamber.

12. In a rotary motor, the combination with an annular piston-chamber revolubly mounted on a port-ring and pistons adapted to operate therein, of a driving member eccentric to said piston-chamber, studs secured to said driving member, pins passing through said pistons and links connecting said studs and said pins for controlling the relative motions of said pistons and said driving member.

13. In a rotary motor, the combination with an annular piston-chamber and pistons adapted to operate therein, of a driving member eccentric to said piston-chamber, connections between said pistons and said driving member, and a coupling connecting said piston-chamber and said driving member to cause them to rotate in the same direction.

14. In a rotary motor, the combination with a suitable frame of the adjustable port-ring 16 mounted therein, said port-ring being provided with inlet and outlet passages and fluid connections, a revoluble annular piston-chamber mounted on said port-ring, having ports adapted to engage inlet and outlet ports in said port-ring, pistons adapted to travel in said annular piston-chamber, a driving member mounted in said frame eccentric to said piston-chamber, means for connecting said pistons with said driving member and means for connecting said driving member with said piston-chamber to cause the two to rotate in the same direction.

15. In a rotary motor, the combination with a suitable frame of the port-ring 16 mounted therein, said port-ring being provided with inlet and outlet passages, a revoluble annular piston-chamber mounted on said port-ring, having ports adapted to engage inlet and outlet ports in said port-ring, pistons adapted to travel in said annular piston-chamber, a driving member mounted in said frame eccentric to said piston-chamber and port-ring, means for connecting said pistons with said driving member, means for connecting said driving member with said piston-chamber to cause the two to rotate in the same direction, and the lead-screw for controlling the position of said port-ring.

16. In a rotary motor, the combination with a suitable frame of the port-ring 16 slidably mounted thereon, the port-ring being provided with inlet and outlet passages, the inlet and outlet tubes 24 and 25 to which the port-ring is slidably connected, said inlet and outlet tubes communicating, respectively, with said inlet and outlet passages, an annular piston-chamber revolubly mounted on said port-ring, having ports adapted to engage the inlet and outlet ports in the port-ring, pistons in said annular piston-chamber, a driving member mounted on said frame and connections between said pistons and said driving member.

In testimony whereof I have signed my name to this specification in the presence of two subscribing witnesses.

EDWIN RUST DOUGLAS.

Witnesses:
EDW. B. HAWKINS,
C. F. CARRINGTON.